(No Model.)
A. W. RUMSEY.
CLEVIS.
No. 400,493. Patented Apr. 2, 1889.
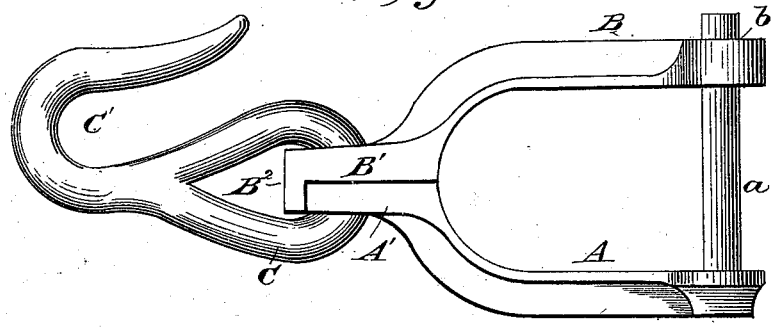
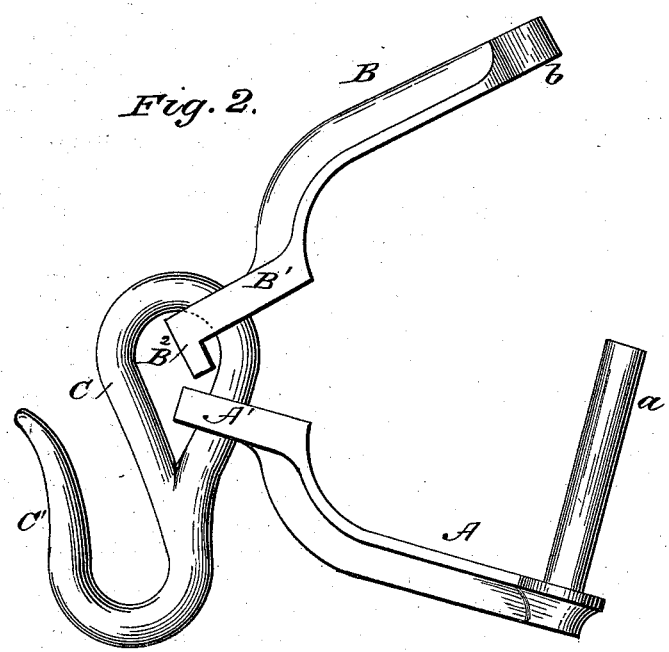
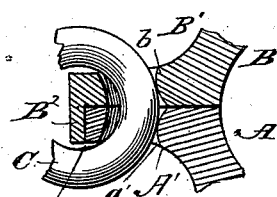
WITNESSES:
Fred G. Dieterich
P. B. Turpin
INVENTOR,
A. W. Rumsey
BY Munn & Co.
ATTORNEYS

UNITED STATES PATENT OFFICE.

ARTHUR W. RUMSEY, OF KIOWA, KANSAS.

CLEVIS.

SPECIFICATION forming part of Letters Patent No. 400,493, dated April 2, 1889.

Application filed June 5, 1888. Serial No. 276,158. (No model.)

*To all whom it may concern:*

Be it known that I, ARTHUR W. RUMSEY, of Kiowa, in the county of Barber and State of Kansas, have invented a new and useful Improvement in Clevises, of which the following is a specification.

This invention is an improvement in clevises; and it consists in certain novel constructions and combinations of parts, as will be hereinafter described and claimed, whereby the clevis will be simple of construction, easy of adjustment into and out of use, and will be secure in use, as will be described.

In the drawings, Figure 1 is a side view of my invention, the clevis proper being shown closed. Fig. 2 in a similar view with the clevis proper open, and Fig. 3 is a sectional detail view.

The clevis proper is formed in two sections, A and B, the former having at its rear end a bolt or stud, $a$, and the latter having an opening or socket, $b$, to receive said bolt. At their forward ends the sections A B have extended portions A' B', separated and lapped together. When these lapped portions are secured tightly together, the clevis will be secured closed in the full-line position shown in Fig. 1. In the construction shown I secure the extended portions A' B' together by providing them, respectively, with coincident openings $a'$ $b'$ and fitting link C therein. I also prefer to provide one of the extended portions with a lip or flange, $B^2$, projected along the front edge of the other portion, as shown. The link C is elongated, and preferably has a hook, C'. When this link C is turned with its end portion in openings $a'$ $b'$, it will secure the portions A' B' tightly together and hold the clevis closed. To open the clevis, the link may be turned as shown in Fig. 2, when the clevis can open, as shown in said figure.

As will be understood from the foregoing and the drawings, the construction is simple, can be easily adjusted, and will be secure in use.

Having thus described my invention, what I claim as new is—

1. In a clevis, the combination, with the clevis bars or sections provided with extended portions lapped together and having coincident openings, of an elongated link secured in said openings and constructed to secure the sections snugly together or to permit their movement apart when adjusted relatively thereto, substantially as described, and for the purposes specified.

2. The herein-described improvement in clevises, consisting of the bars or sections provided at one end, the one with a bolt and the other with an opening or socket to receive said bolt, and having at their opposite ends extended portions provided with coincident openings and one having a flange or lip extended along the end of the other, and the elongated link secured in said openings and having a hook, substantially as set forth.

3. An improved clevis comprising bars or sections separable at one end and provided at their opposite ends with portions having coincident openings, and an elongated link passed through said openings and adjustable, whereby it may be set to secure the said portions together or to permit their movement apart, all substantially as and for the purposes specified.

4. A clevis consisting of bar or section A, having end portion, A', the bar or section B, having end portion, B', lapped against portion A', and provided at its end with a lip or flange, $B^2$, extended along the end of portion A', the parts A' and B' being provided with coincident openings, and the elongated link passed through said openings and adjustable, all substantially as and for the purposes specified.

ARTHUR W. RUMSEY.

Witnesses:
CHAS. E. DECATUR,
HARRY E. MATTHEWS.